(12) United States Patent
Iyengar

(10) Patent No.: US 9,031,969 B2
(45) Date of Patent: May 12, 2015

(54) GUARANTEED IN-FLIGHT SQL INSERT OPERATION SUPPORT DURING AN RAC DATABASE FAILOVER

(75) Inventor: Venkatesh M J Iyengar, Bangalore Karnataka (IN)

(73) Assignee: Oracle International Corporation, Redwood Shores, CA (US)

(*) Notice: Subject to any disclaimer, the term of this patent is extended or adjusted under 35 U.S.C. 154(b) by 334 days.

(21) Appl. No.: 12/844,657

(22) Filed: Jul. 27, 2010

(65) Prior Publication Data

US 2011/0320409 A1 Dec. 29, 2011

Related U.S. Application Data

(60) Provisional application No. 61/359,481, filed on Jun. 29, 2010.

(51) Int. Cl.
*G06F 17/30* (2006.01)
*G06F 11/20* (2006.01)

(52) U.S. Cl.
CPC ...... *G06F 17/30377* (2013.01); *G06F 11/2023* (2013.01)

(58) Field of Classification Search
CPC ................... G06F 17/30067; G06F 17/30454; G06F 11/2023; G06F 17/30377
USPC ........................................ 707/999.1, 999.204
See application file for complete search history.

(56) References Cited

U.S. PATENT DOCUMENTS

2004/0199519 A1* 10/2004 Gu et al. ........................ 707/100
2009/0222498 A1* 9/2009 Lu et al. ........................ 707/204

* cited by examiner

*Primary Examiner* — Ann Lo
(74) *Attorney, Agent, or Firm* — Kilpatrick Townsend & Stockton LLP

(57) ABSTRACT

The present invention is directed to methods and systems of implementing a guaranteed SQL insert operation. In one embodiment, the method may include initiating an SQL insert operation for a database, receiving an SQL exception indicating that a failover for the database has occurred, and in response to the SQL exception, caching the SQL insert operation and caching the SQL insert operation as an SQL merge operation. The method further includes determining that a primary key is associated with the SQL insert operation, and in response to determining that a primary key is associated with the SQL insert operation, executing the SQL merge operation.

20 Claims, 7 Drawing Sheets

```
CREATE TABLE EMPLOYEE
{
  ID INT (1) PK,
  NAME varchar2 (25)
};
```

Figure 3A

```
INSERT INTO EMPLOYEE VALUES (1, 'HARRY');

MERGE INTO EMPLOYEE
  USING DUAL ON (EMPLOYEE.ID=1)
  WHEN NOT MATCHED THEN
  INSERT VALUES (1,'HARRY')
  WHEN MATCHED THEN
  UPDATE SET EMPLOYEE.NAME = 'HARRY';
```

Figure 3B

GUARANTEED IN-FLIGHT SQL INSERT OPERATION SUPPORT DURING AN RAC DATABASE FAILOVER

CROSS REFERENCE TO RELATED APPLICATIONS

The present application claims priority to U.S. Provisional Application No. 61/359,481 filed Jun. 29, 2010 entitled "GUARANTEED IN-FLIGHT SQL INSERT OPERATION SUPPORT DURING AN RAC DATABASE FAILOVER", incorporated by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Presently, when an application (such as a business activity monitoring (BAM) application) with an internal primary key generation strategy is attempting to execute an insert operation against a real application cluster (RAC) enabled database, there is no way to generate a successful "in-flight" (or real-time) insert operation in the event of an RAC node failure (which eventually will failover to another database node transparently). As such, if the database failed over at the same time as the SQL insert was attempted, then the SQL insert "may" or "may not" fail to execute. Presently, there is no way to be certain of whether the SQL insert was performed before the failure, not performed before the failure. Each or these situations causes separate significant problems with the integrity of the database. Further, simply retrying the insert does not present a viable solution. This is due to the fact that the insert operation might have been successfully executed, but the failure merely interrupted the acknowledgment of the insert; thus re-executing the insert would cause redundancies and inaccuracies within the database All of these situations call into question the accuracy and integrity of the database. Furthermore, presently, only by a manual inspection (which is time consuming, inefficient, and inaccurate) can such problems be identified. Hence, improved rating and ranking methods and systems are needed in the art.

SUMMARY OF THE INVENTION

One embodiment of the present invention is directed to a method of implementing a guaranteed SQL insert operation. In one embodiment, the method may include initiating an SQL insert operation for a database, receiving an SQL exception indicating that a failover for the database has occurred, and in response to the SQL exception, caching the SQL insert operation and caching the SQL insert operation as an SQL merge operation. The method further includes determining that a primary key is associated with the SQL insert operation, and, in response to determining that a primary key is associated with the SQL insert operation, executing the SQL merge operation.

A further embodiment of the present invention is directed to a machine-readable medium for implementing a guaranteed SQL insert operation. In one embodiment, the machine-readable medium may include instructions for initiating an SQL insert operation for a database, receiving an SQL exception indicating that a failover for the database has occurred, and, in response to the SQL exception, caching the SQL insert operation and caching the SQL insert operation as an SQL merge operation. The machine-readable medium further includes instructions for determining that a primary key is associated with the SQL insert operation, and, in response to determining that a primary key is associated with the SQL insert operation, executing the SQL merge operation.

Another embodiment of the present invention includes a system for implementing a guaranteed SQL insert operation. The system includes a business monitoring (BAM) system including a cache storage memory. The BAM is configured to initiating an SQL insert operation. The system further includes a real application cluster (RAC) database in communication with the BAM system. The RAC database includes a plurality of nodes and is configured to receive the SQL insert operation and generate an SQL exception indicating that a failover for at least one of the plurality of nodes in the database has occurred. The BAM system is further configured to receive the SQL exception, in response to receiving the SQL exception, cache, in the cache storage memory, the SQL insert operation and cache the SQL insert operation as an SQL merge operation. The BAM system is further configured to determine that a primary key is associated with the SQL insert operation, and, in response to determining that a primary key is associated with the SQL insert operation, execute the SQL merge operation.

BRIEF DESCRIPTION OF THE DRAWINGS

FIGS. 3A and 3B are simplified flow diagrams illustrating a method of implementing a guaranteed in-flight SQL insert operation, according to an embodiment of the present invention.

DETAILED DESCRIPTION OF THE INVENTION

The present invention is directed to providing guaranteed in-flight SQL insert operations. This operation may be implemented by backing up each SQL insert operation with an SQL merge operation, and then retrying the SQL merge operation in the event of a database node failure. The SQL merge operation, when retired, first looks for the primary key associated with the table to be inserted, and, if the primary key is found, will update the table (which would essentially be a redundant update operation). However, if the primary key is not found, then the merge operation performs the insert operation, thus providing for an automatic solution to retry inserts in the event of a failover.

Figure 1:
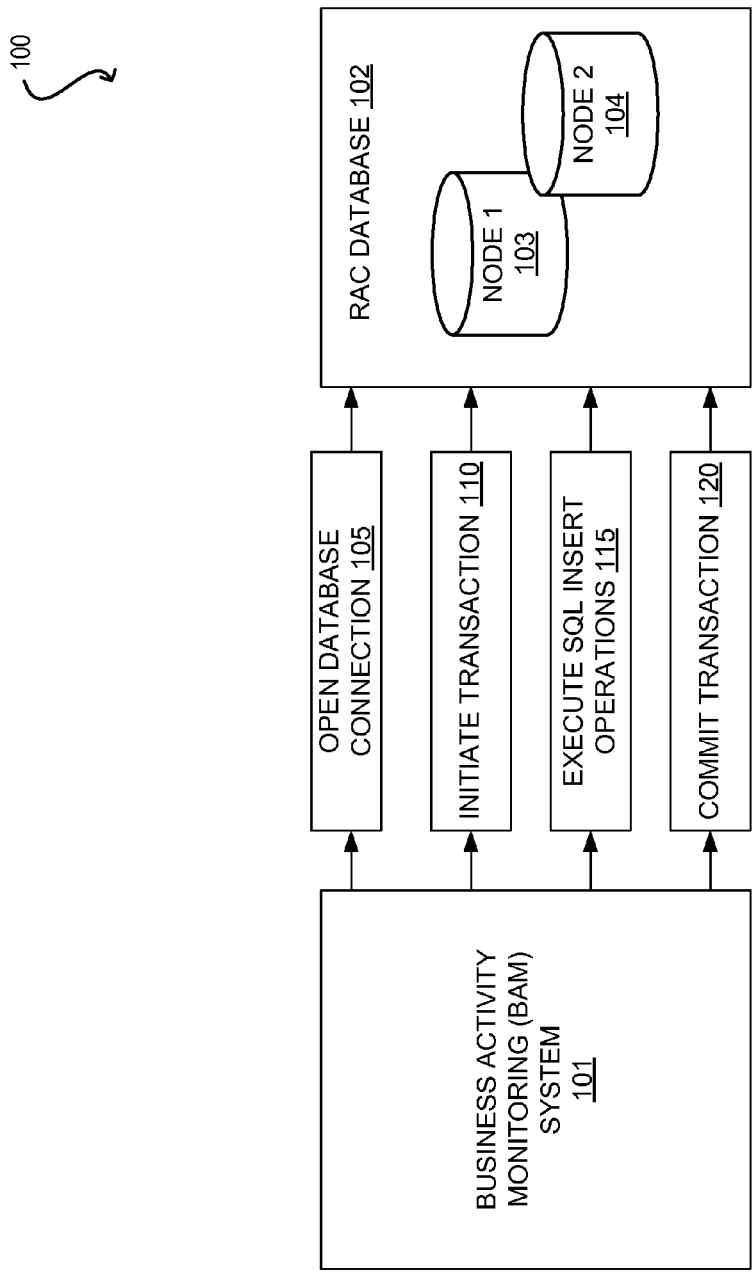
FIG. 1 is a simplified flow diagram illustrating a method of implementing an SQL insert operation, according to an embodiment of the present invention.

Turning now to FIG. 1, which illustrates a method 100 of implementing an SQL insert operation, in connection with embodiments of the present invention. At process block 105, business activity monitoring (BAM) system 101 may open a database connection with a real application cluster (RAC) database 102. In one embodiment, the RAC database 102 may include a node 1 103 and a node 2 104. Additional nodes may be included in RAC database 102.

At process block 110, the BAM 101 may initiate a transaction with the RAC database 102. The transaction may include an SQL insert operation(s) to be performed on the RAC database 102 (process block 115); however, other SQL operations may also be initiated. At process block 120 (assuming no failures or other problems occur), the SQL operation is committed to the RAC database 102.

Turning now to FIG. 3, which illustrates a method 200 of implementing a guaranteed in-flight SQL insert operation in response to a failover, according to a further embodiment of the present invention. If a failover were to occur in method 100, there would be no way for an operator or database administrator (DBA) to determine the status of the SQL insert operation, an data corruption, if the failover occurred prior to the SQL insert operation, etc. In other words, when a failover occurs there is no way (aside from a manual check of each table by a DBA) to determine which operations were committed or which operations were not committed. As such, method 200 provides a solution to such an occurrence, without the need for a manual review of the database by a DBA, or the like.

At process block 205, an SQL insert operation may be initiated. An embodiment of the SQL insert operation may be as shown in FIG. 3A; however, other configurations of the SQL insert operation may be used. At decision block 210, a determination is made whether a failover has occurred in the database. In one embodiment, the failover may include a drive failure, a system failure, a connection failure, and the like. If no failover is detected, then method 200 returns to process block 205 and continues to initiate SQL operations until a failover is detected.

If a failover is detected, then, at process block 215, an SQL exception statement is received. The SQL Exception that is received may indicate an error code "0" or another condition that would indicate that the failover occurred and the connection is not reusable. In one embodiment, the SQL exception operation may indicate that the database connection is not usable, or any other error. In response to receiving the SQL exception, the SQL insert operation may be cached and stored in a storage memory (process block 220). Further, the SQL insert operation may also be cached as an SQL merge operation. In one embodiment, the SQL merge operation may be as found in FIG. 3B; however, other SQL merge operation configurations may be used.

In one embodiment, the merge statement provides a number of benefits over simply re-executing the SQL insert statement. For example, as discussed before, it is impossible to know (without a manual check of the database information) when the failover occurred (i.e., before the insert was executed, during the execution of the insert, or after the insert completed). If the failover occurred during the execution of the insert (i.e., only a portion of the update occurred), then incomplete or corrupted data is left in the table of the database. However, the merge operation does not suffer from the same issues as the insert operation.

Thus, in order to determine the point at which the failover occurred, a determination is made if a primary key associated with the insert operation was created (decision block 225). If a primary key was created, then the insert operation is determined to have begun and completed. Without a manual examination of the data, it is impossible to determine which of the two scenarios occurred; however, executing a merge operation remedies either situation. Accordingly, at process block 330, the SQL merge operation is executed. Thus, the incomplete insert is repaired, or a completed insert is simply rewritten (which only utilizes extra resources, but maintains the data's integrity).

Alternatively, if it is determined that no primary key was associated with the insert operation, then that indicates that the failover occurred prior to execution of the insert statement. In other words, the insert statement was never started. As such, the same SQL insert operation can simply be re-executed as opposed to using a merge operation (process block 335).

Figure 4:
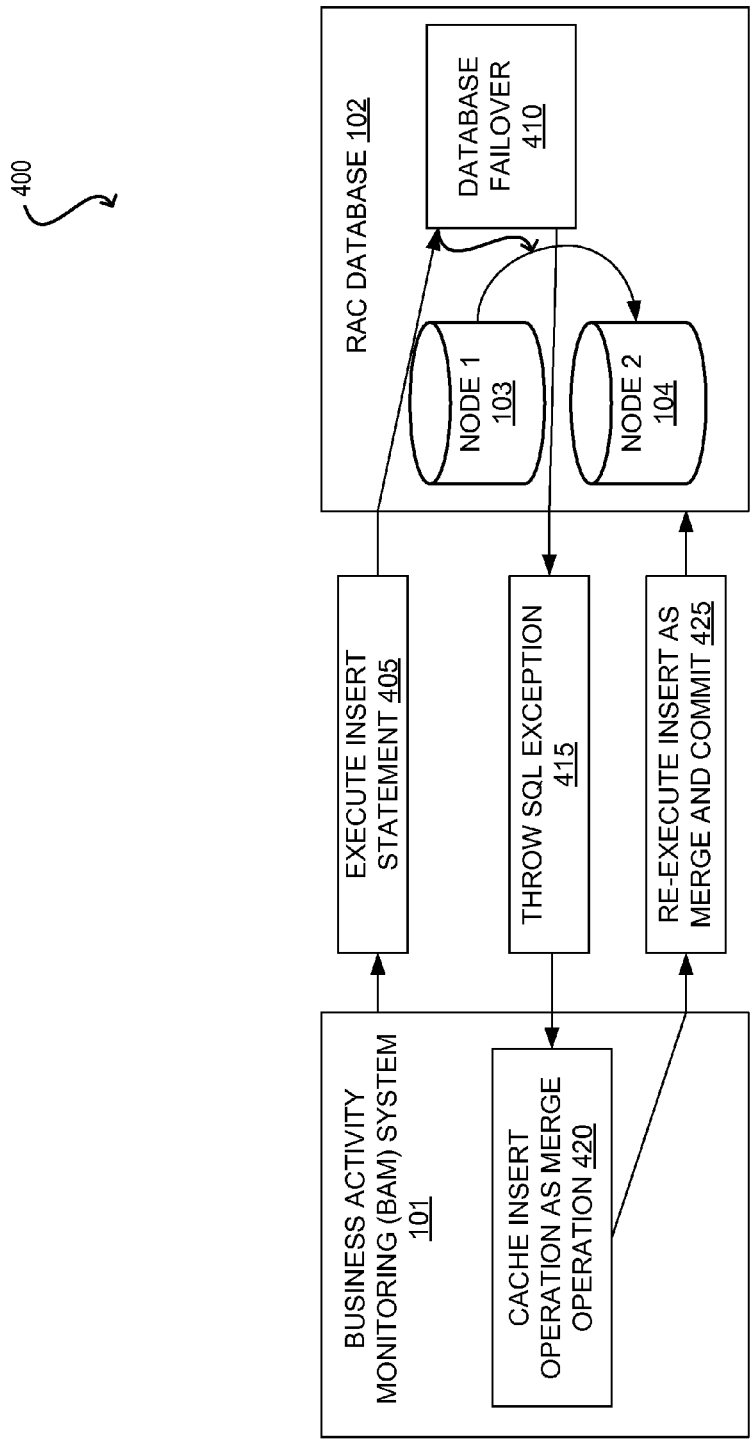
FIG. 4 is a simplified flow diagram illustrating a method of implementing a guaranteed in-flight SQL insert operation, according to a further embodiment of the present invention.

FIG. 4 illustrates a system 400 for implementing a guaranteed in-flight SQL insert operation, according to a further embodiment of the present invention. In one embodiment, the BAM system 100 executes an insert statement 405. The RAC database 102 receives the insert and begins to process the operation. When a database failover is detected (410), the RAC database 102 throws an SQL exception (415). The BAM system 101 receives the exception and in response caches the insert statement as a merge statement (420). Then, the insert is re-executed as the merge statement (425), and the high availability (HA) integrity of the RAC database 102 is maintained.

Figure 2:
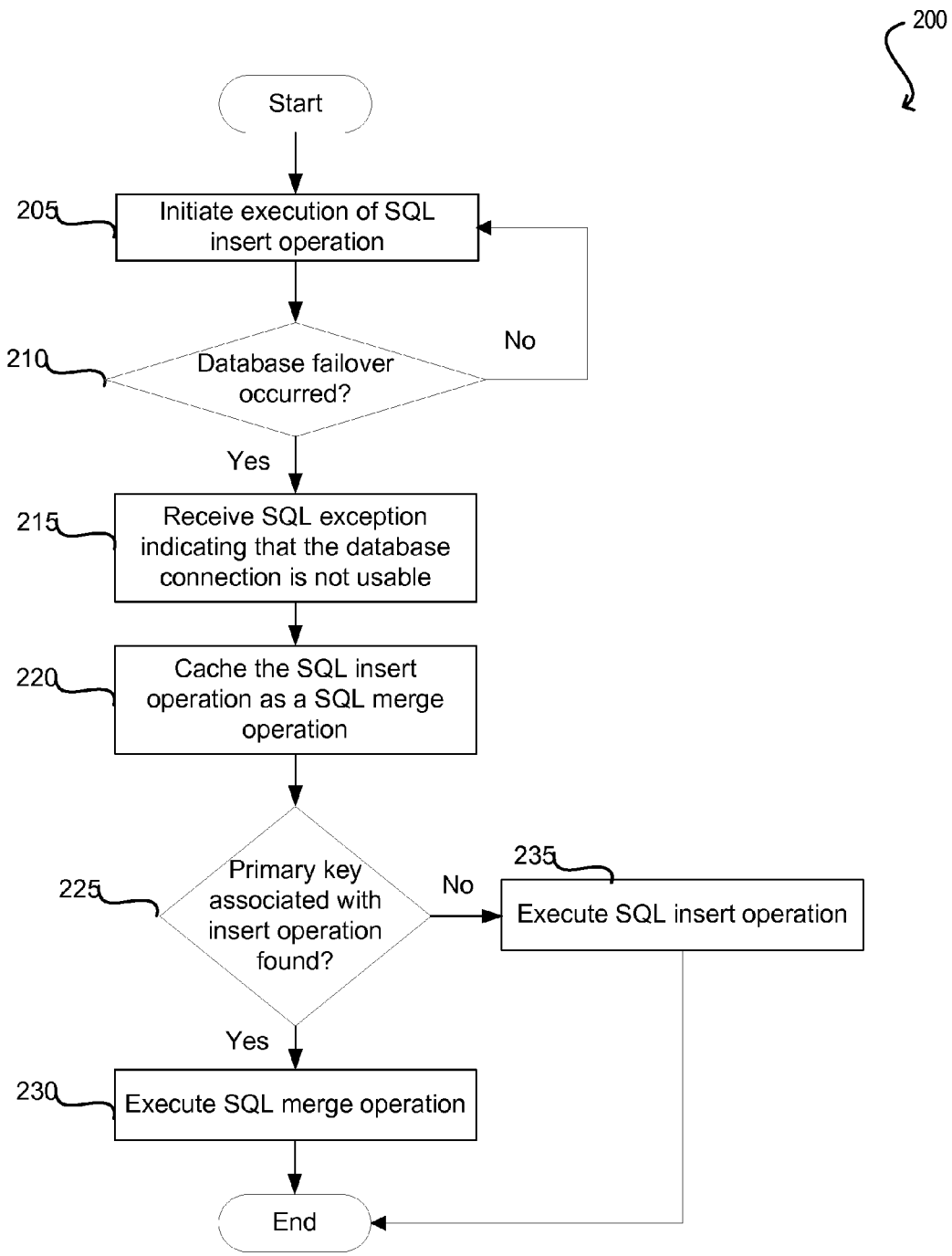
FIG. 2 is an example of an SQL table and an accompanying SQL insert and merge operation, in connection with embodiments of the present invention.
Figure 5:
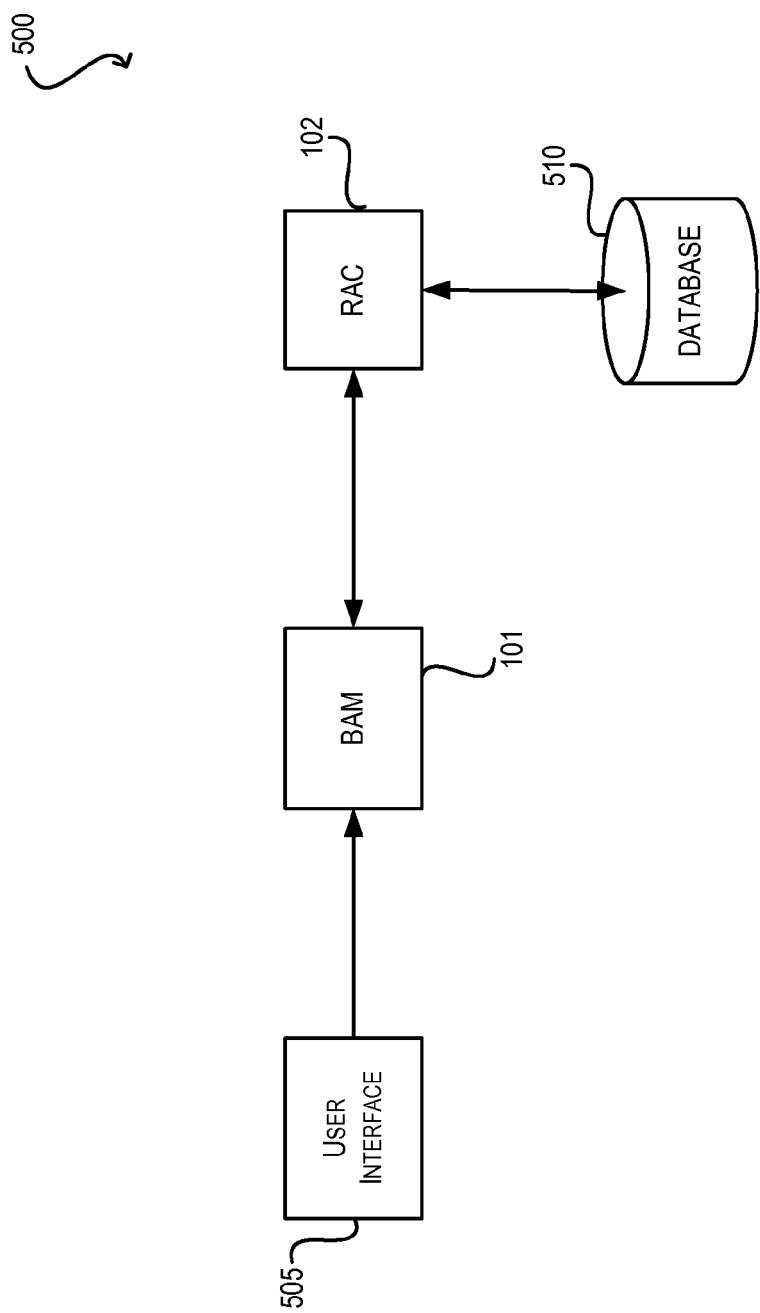
FIG. 5 is a simplified block diagram illustrating a system for implementing a guaranteed in-flight SQL insert operation, according to a further embodiment of the present invention.

Referring now to FIG. 5, which illustrates a system 500 for implementing a guaranteed in-flight SQL insert operation, according to a further embodiment of the present invention. In one embodiment, system 500 includes a user interface in communication with the BAM system 101. Further, the BAM system 101 is in communication with the RAC 102 and database 510. The system 500 may be used to implement the methods of FIG. 1, 2, or 4.

Figure 6:
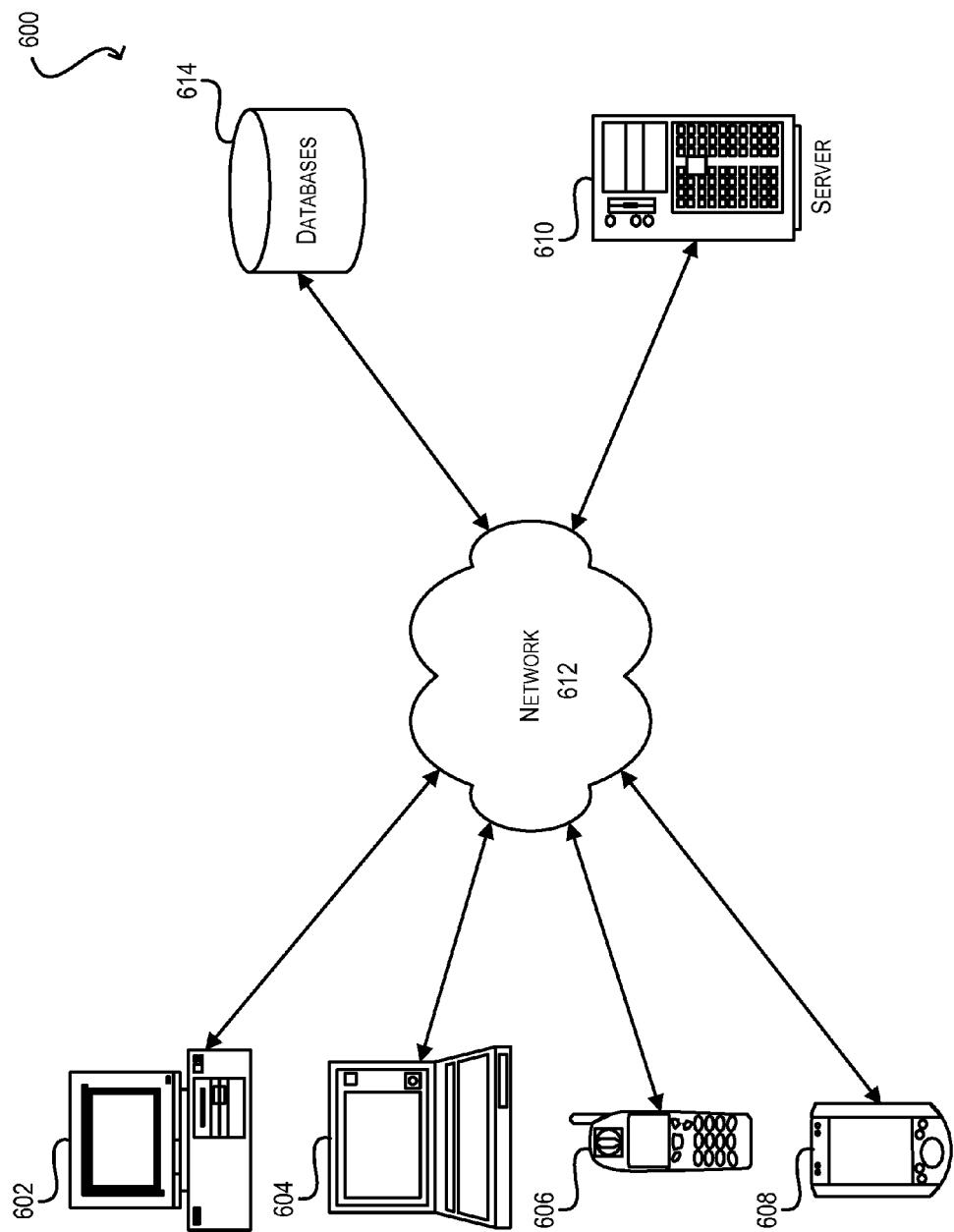
FIG. 6 is a simplified block diagram illustrating physical components of a system environment 600 that may be used in accordance with an embodiment of the present invention.

FIG. 6 is a simplified block diagram illustrating physical components of a system environment 600 that may be used in accordance with an embodiment of the present invention. This diagram is merely an example, which should not unduly limit the scope of the claims. One of ordinary skill in the art would recognize many variations, alternatives, and modifications.

As shown, system environment 600 includes one or more client computing devices 602, 604, 606, 608 communicatively coupled with a server computer 610 via a network 612. In one set of embodiments, client computing devices 602, 604, 606, 608 may be configured to run one or more components of a graphical user interface described above. For example, client computing devices allow user to create and customize network communities, enter search queries, view search results, and others.

Client computing devices 602, 604, 606, 608 may be general purpose personal computers (including, for example, personal computers and/or laptop computers running various versions of Microsoft Windows™ and/or Apple Macintosh™ operating systems), cell phones or PDAs (running software such as Microsoft Windows™ Mobile and being Internet, e-mail, SMS, Blackberry,™ and/or other communication protocol-enabled), and/or workstation computers running any of a variety of commercially available UNIX™ or UNIX™-like operating systems (including without limitation the variety of GNU/Linux™ operating systems). Alternatively, client computing devices 602, 604, 606, and 608 may be any other electronic device capable of communicating over a network (e.g., network 612 described below) with server computer 610. Although system environment 600 is shown with four client computing devices and one server computer, any number of client computing devices and server computers may be supported.

Server computer 610 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 610 may run an operating system including any of those discussed above, as well as any commercially available server operating system. Server computer 610 may also run any of a variety of server applications and/or mid-tier applications, including web servers, Java virtual machines, application servers, database servers, and the like. In various embodiments, server computer 610 is adapted to run one or more Web services or software applications described in the foregoing disclosure. For example, server computer 610 is specifically configured to implement enterprise procurement systems described above.

As shown, client computing devices 602, 604, 606, 608 and server computer 610 are communicatively coupled via network 612. Network 612 may be any type of network that can support data communications using any of a variety of commercially available protocols, including without limitation TCP/IP, SNA, IPX, AppleTalk™, and the like. Merely by way of example, network 612 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol known in the art, and/or any other wireless protocol); and/or any combination of these and/or other networks. In various embodiments, the client computing devices 602, 604, 606, 608 and server computer 610 are able to access the database 614 through the network 612. In certain embodiments, the client computing devices 602, 604, 606, 608 and server computer 610 each has its own database.

System environment 600 may also include one or more databases 614. Database 614 may correspond to an instance of integration repository as well as any other type of database or data storage component described in this disclosure. Database 614 may reside in a variety of locations. By way of example, database 614 may reside on a storage medium local to (and/or resident in) one or more of the computing devices 602, 604, 606, 608, or server computer 610. Alternatively, database 614 may be remote from any or all of the computing devices 602, 604, 606, 608, or server computer 610 and/or in communication (e.g., via network 612) with one or more of these. In one set of embodiments, database 614 may reside in a storage-area network (SAN) familiar to those skilled in the art. Similarly, any necessary files for performing the functions attributed to the computing devices 602, 604, 606, 608, or server computer 610 may be stored locally on the respective computer and/or remotely on database 614, as appropriate. For example, the database 614 stores user profiles, procurement information, and/or attributes associated with network entities.

Figure 7:
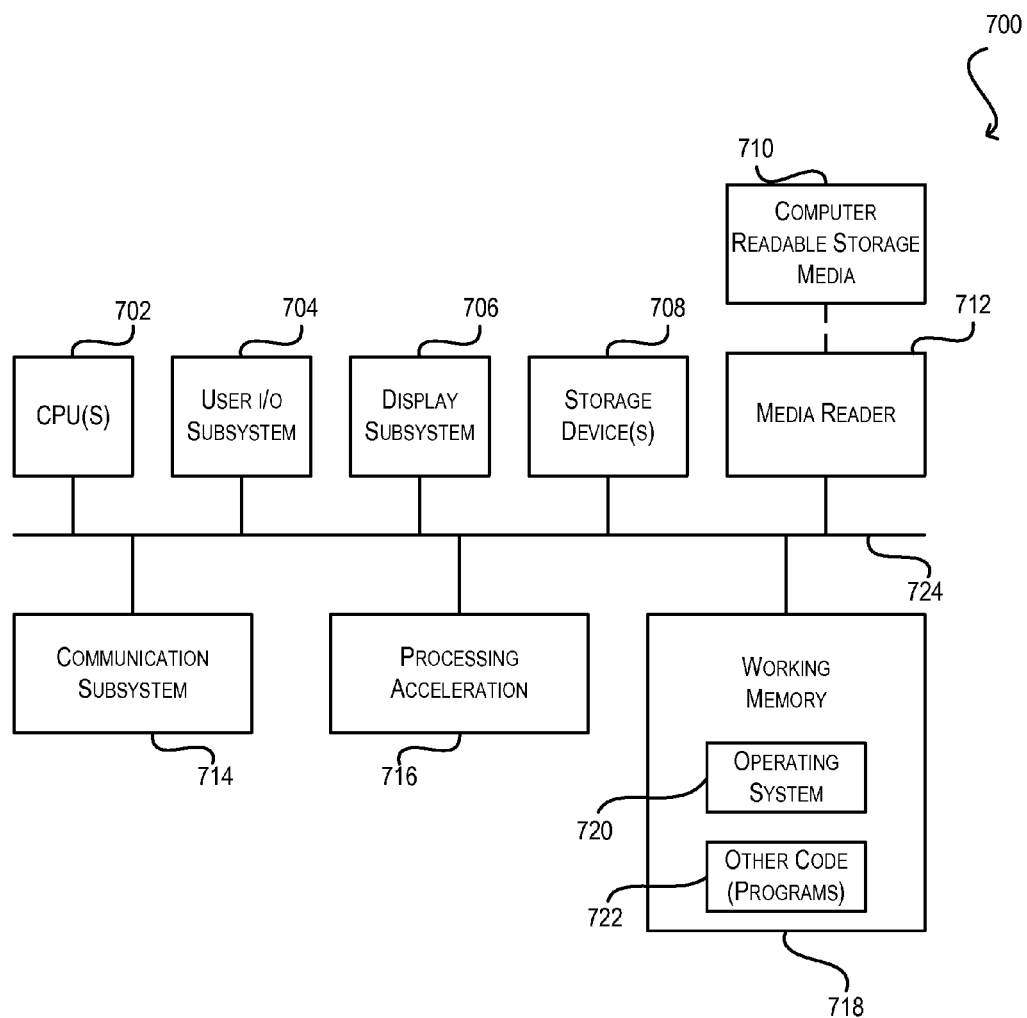
FIG. 7 is a simplified block diagram illustrating the physical components of a computer system 700 that may be used in accordance with an embodiment of the present invention.

FIG. 7 is a simplified block diagram illustrating the physical components of a computer system 700 that may be used in accordance with an embodiment of the present invention. This diagram is merely an example, which should not unduly limit the scope of the claims. One of ordinary skill in the art would recognize many variations, alternatives, and modifications.

In various embodiments, computer system 700 may be used to implement any of the computing devices 602, 604, 606, 608, or server computer 610 illustrated in system environment 600 described above. As shown in FIG. 7, computer system 700 comprises hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). For example, the input devices 704 are used to receive user inputs for procurement-related search queries. Computer system 700 may also include one or more storage devices 708. By way of example, storage devices 708 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 708. For example, the central processing unit 702 is configured to retrieve data from a database and process the data for displaying on a GUI.

Computer system 700 may additionally include a computer-readable storage media reader 712, a communications subsystem 714 (e.g., a modem, a network card (wireless or wired), an infra-red communication device, etc.), and working memory 718, which may include RAM and ROM devices as described above. In some embodiments, computer system 700 may also include a processing acceleration unit 716, which can include a digital signal processor (DSP), a special-purpose processor, and/or the like.

Computer-readable storage media reader 712 can further be connected to a computer-readable storage medium 710, together (and, optionally, in combination with storage devices 708) comprehensively representing remote, local, fixed, and/or removable storage devices plus storage media for temporarily and/or more permanently containing computer-readable information. Communications system 714 may permit data to be exchanged with network 612 of FIG. 6 and/or any other computer described above with respect to system environment 600.

Computer system 700 may also comprise software elements, shown as being currently located within working memory 718, including an operating system 720 and/or other code 722, such as an application program (which may be a client application, Web browser, mid-tier application, RDBMS, etc.). In a particular embodiment, working memory 718 may include executable code and associated data structures for one or more of the design-time or runtime components/services. It should be appreciated that alternative embodiments of computer system 700 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 700.

In one set of embodiments, the techniques described herein may be implemented as program code executable by a computer system (such as a computer system 700) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of implementing a guaranteed SQL insert operation, the method comprising:
   initiating an SQL insert operation for a database, wherein the database is configured to allow multiple nodes in a clustered system to mount and open a single database that resides on shared disk storage, such that if a single system should fail, database service will still be available on all other remaining nodes;
   receiving an SQL exception indicating that a failover for the database has occurred while the SQL insert operation is in-flight;
   in response to the SQL exception, caching the SQL insert operation as an SQL merge operation;
   determining whether a primary key associated with the SQL insert operation has been created in the database;
   in response to determining that the primary key associated with the SQL insert operation has been created in the database, executing the SQL merge operation; and
   in response to determining that the primary key associated with the SQL insert operation has not been created in the database, executing the SQL insert operation.

2. The method of implementing a guaranteed SQL insert operation as in claim 1, further comprising determining that no primary key is associated with the SQL insert operation.

3. The method of implementing a guaranteed SQL insert operation as in claim 2, further comprising in response to determining that no primary key is associated with the SQL insert operation, re-executing the SQL insert operation.

4. The method of implementing a guaranteed SQL insert operation as in claim 1, wherein the SQL exception is received by a business activity monitoring (BAM) system.

5. The method of implementing a guaranteed SQL insert operation as in claim 4, wherein the BAM system comprises a user interface.

6. The method of implementing a guaranteed SQL insert operation as in claim 1, wherein the database comprises a real application cluster (RAC) database.

7. The method of implementing a guaranteed SQL insert operation as in claim 6, wherein the RAC database comprises a first node and a second node.

8. The method of implementing a guaranteed SQL insert operation as in claim 7, wherein the SQL insert operation comprises inserting information from the first node to the second node.

9. The method of implementing a guaranteed SQL insert operation as in claim 1, wherein the SQL merge statement comprises an SQL update statement.

10. The method of implementing a guaranteed SQL insert operation as in claim 1, wherein in response to the failover, the SQL merge operation provides high availability (HA) to the database.

11. The method of implementing a guaranteed SQL insert operation as in claim 10, wherein the HA is provided to the database without any user interaction.

12. A computer-readable storage medium having sets of instructions stored thereon which, when executed by a computer, cause the computer to:
   initiate an SQL insert operation for a database, wherein the database is configured to allow multiple nodes in a clustered system to mount and open a single database that resides on shared disk storage, such that if a single system should fail, database service will still be available on all other remaining nodes;
   receive an SQL exception indicating that a failover for the database has occurred while the SQL insert operation is in-flight;
   in response to the SQL exception, caching the SQL insert operation within as an SQL merge operation;
   determine whether a primary key associated with the SQL insert operation has been created in the database;
   in response to determining that the primary key associated with the SQL insert operation has been created in the database, executing the SQL merge operation; and
   in response to determining that the primary key associated with the SQL insert operation has not been created in the database, executing the SQL insert operation.

13. The computer-readable storage medium of claim 12, wherein the sets of instructions, when further executed by the computer, cause the computer to determine that no primary key is associated with the SQL insert operation.

14. The computer-readable storage medium of claim 13, wherein the sets of instructions, when further executed by the computer, cause the computer to in response to determining that no primary key is associated with the SQL insert operation, re-execute the SQL insert operation.

15. The computer-readable storage medium of claim 12, wherein the SQL exception is received by a business activity monitoring (BAM) system.

16. The computer-readable storage medium of claim 15, wherein the BAM system comprises a user interface.

17. The computer-readable storage medium of claim 12, wherein the database comprises a real application cluster (RAC) database.

18. The computer-readable storage medium of claim 17, wherein the RAC database comprises a first node and a second node.

19. The computer-readable storage medium of claim 18, wherein the SQL insert operation comprises inserting information from the first node to the second node.

20. A system comprising:
   one or more processors; and a memory coupled with and readable by the one or more processors and storing therein a set of instructions which, when executed by the processors, causes the processors to implement a guaranteed SQL insert operation by:
  initiating an SQL insert operation for a database, wherein the database is configured to allow multiple nodes in a clustered system to mount and open a single database that resides on shared disk storage, such that if a single system should fail, database service will still be available on all other remaining nodes;
  receiving an SQL exception indicating that a failover for the database has occurred while the SQL insert operation is in-flight;
  in response to the SQL exception, caching the SQL insert operation as an SQL merge operation;
  determining whether a primary key associated with the SQL insert operation has been created in the database;
  in response to determining that the primary key associated with the SQL insert operation has been created in the database, executing the SQL merge operation; and
  in response to determining that the primary key associated with the SQL insert operation has not been created in the database, executing the SQL insert operation.

* * * * *

UNITED STATES PATENT AND TRADEMARK OFFICE
CERTIFICATE OF CORRECTION

| | | |
|---|---|---|
| PATENT NO. | : 9,031,969 B2 | Page 1 of 1 |
| APPLICATION NO. | : 12/844657 | |
| DATED | : May 12, 2015 | |
| INVENTOR(S) | : Iyengar | |

It is certified that error appears in the above-identified patent and that said Letters Patent is hereby corrected as shown below:

In the specification,

In column 1, line 44, delete "database" and insert -- database. --, therefor.

In column 4, line 60, delete "Blackberry,™" and insert -- Blackberry™, --, therefor.

In the claims,

In column 8, line 34, in Claim 12, delete "within as" and insert -- as --, therefor.

Signed and Sealed this
Ninth Day of February, 2016

Michelle K. Lee
*Director of the United States Patent and Trademark Office*